US012356953B2

(12) United States Patent
Jiang et al.

(10) Patent No.: US 12,356,953 B2
(45) Date of Patent: Jul. 15, 2025

(54) INTELLIGENT CAT LITTER BOX

(71) Applicant: Hefei Jiqu Network Technology Co., Ltd., Hefei (CN)

(72) Inventors: Nan Jiang, Hefei (CN); Ting He, Hefei (CN); Yi Qin, Hefei (CN)

(73) Assignee: Hefei Jiqu Network Technology Co., Ltd., Hefei (CN)

( * ) Notice: Subject to any disclaimer, the term of this patent is extended or adjusted under 35 U.S.C. 154(b) by 0 days.

(21) Appl. No.: 18/984,421

(22) Filed: Dec. 17, 2024

(65) Prior Publication Data

US 2025/0113800 A1     Apr. 10, 2025

Related U.S. Application Data

(63) Continuation of application No. PCT/CN2023/124481, filed on Oct. 13, 2023.

(30) Foreign Application Priority Data

Aug. 15, 2023     (CN) .......................... 202311027921.2

(51) Int. Cl.
*A01K 1/01*     (2006.01)
(52) U.S. Cl.
CPC ................. *A01K 1/0114* (2013.01)
(58) Field of Classification Search
CPC .... A01K 1/0114; A01K 1/011; A01K 1/0107; A01K 1/0125; A01K 23/005; A01K 1/0117; A01K 31/04

(Continued)

(56) References Cited

U.S. PATENT DOCUMENTS 5,048,464 A * 9/1991 Shirley ................ A01K 1/0114
209/362
9,834,376 B1 * 12/2017 Stravitz ................ B65F 1/0026
(Continued)

FOREIGN PATENT DOCUMENTS

CN     114667939 A     6/2022
CN     217038343 U     7/2022
(Continued)

OTHER PUBLICATIONS

First Office Action issued in counterpart Chinese Patent Application No. 202311027921.2, dated May 25, 2024.
(Continued)

*Primary Examiner* — Marc Burgess
(74) *Attorney, Agent, or Firm* — Westbridge IP LLC

(57) ABSTRACT

An intelligent cat litter box includes a filter screen assembly and a connector. The filter screen assembly is disposed at a respective opening position of a litter collecting bin, and an edge of one side away from the litter collecting bin can fit with an inner wall of a ball bin; and the connector is disposed in the ball bin, and can not only fit with the filter screen assembly rotationally in clockwise and counterclockwise directions, but also be in clamping fit with the filter screen assembly in itself circumferential direction. According to the intelligent cat litter box, the filter screen assembly is mounted at the opening position of the litter collecting bin through the connector to achieve the separation of a cat litter ball from the cat litter, and the cat litter enter the litter collecting bin.

2 Claims, 10 Drawing Sheets

(58) Field of Classification Search
USPC .......................................... 119/165, 161, 462
See application file for complete search history.

(56) References Cited

U.S. PATENT DOCUMENTS

| | | | |
|---|---|---|---|
| 11,523,586 B2* | 12/2022 | Baxter | A01K 1/0114 |
| 12,075,750 B2* | 9/2024 | Zhou | A01K 1/0114 |
| 2008/0017123 A1* | 1/2008 | Chin | A01K 1/011 |
| | | | 119/166 |
| 2013/0055959 A1* | 3/2013 | Spectre | A01K 1/0107 |
| | | | 119/165 |
| 2019/0014739 A1* | 1/2019 | Darmanjian | A01K 1/0107 |
| 2021/0267158 A1* | 9/2021 | Ma | A01K 1/011 |
| 2023/0363348 A1* | 11/2023 | Pan | A01K 1/0114 |
| 2023/0380378 A1* | 11/2023 | Smith | A01K 1/0114 |

FOREIGN PATENT DOCUMENTS

| | | |
|---|---|---|
| CN | 218126159 U | 12/2022 |
| CN | 116058288 A | 5/2023 |
| CN | 218945628 U | 5/2023 |

OTHER PUBLICATIONS

Notification to Grant Patent Right for Invention issued in counterpart Chinese Patent Application No. 202311027921.2, dated Jul. 22, 2024.

* cited by examiner

INTELLIGENT CAT LITTER BOX

CROSS-REFERENCE TO RELATED APPLICATIONS

The application is a continuation of International Application No. PCT/CN2023/124481, filed on Oct. 13, 2023, which claims priority to Chinese Patent Application No. 202311027921.2, filed on Aug. 15, 2023. All of the aforementioned applications are incorporated herein by reference in their entireties.

TECHNICAL FIELD

The present disclosure relates to the technical field of intelligent cat litter boxes, and in particular to an intelligent cat litter box.

BACKGROUND

With the improvement of living standards, more and more people select to raise cats, and a cat litter box is an essential article for raising cats. An intelligent cat litter box appears to free both hands of the cat's owner as the cat industry develops.

In the current intelligent cat litter box, automatic defecation is that the separation of cat litters from cat litter balls is generally achieved by cooperating a rotatable ball bin with a filter screen. In order to ensure cleanliness, the filter screen therein needs to be cleaned after long-term use. But the filter screen of the current intelligent cat litter box is mostly a fixed filter screen or a movable filter screen, the entire ball bin needs to be cleaned when the fixed filter screen is cleaned, leading to an inconvenient cleaning operation. The movable filter screen, such as a filter screen for an intelligent cat litter box with the patent number CN218945628U, can be disassembled for separate cleaning, and the filter screen is prone to being deformed and damaged when disassembled.

SUMMARY

The technical issue to be solved by the present disclosure is to provide an intelligent cat litter box that can be disassembled and convenient to disassemble.

To address the above-mentioned technical problem, the present disclosure adopts the following technical solution: an intelligent cat litter box, including a bottom pallet, a ball bin capable of rotating on the bottom pallet in clockwise and counterclockwise directions, a litter collecting bin disposed in the ball bin to collect cat litters along the rotation of the ball bin, an excrement collecting bin disposed in the ball bin to collect cat litter balls along the rotation of the ball bin, and a cat litter placing area disposed in the ball bin; wherein the cat litters in the cat litter placing area can flow into the litter collecting bin along the rotation of the ball bin, and the cat litters in the litter collecting bin can flow into the cat litter placing area along the rotation of the ball bin; the intelligent cat litter box further includes a filter screen assembly and a connector, where the filter screen assembly is disposed at a respective opening position of the litter collecting bin, and an edge of one side away from the litter collecting bin can fit with an inner wall of the ball bin; and the connector is disposed in the ball bin, and can not only fit with the filter screen assembly rotationally in the clockwise and counterclockwise directions, but also be in clamping fit with the filter screen assembly in itself circumferential direction.

Further, the connector at least includes two connecting columns arranged symmetrically, each of the connecting columns is provided with a rotary slot along itself length direction, and a circumferential direction of at least one of the connecting columns is further provided with a gap communicating with the rotary slot; and the filter screen assembly includes a rotary shaft, both ends of the rotary shaft can fit with the two rotary slots rotationally respectively, and the rotary shaft can also be in clamping fit with the gap.

Further, the filter screen assembly further includes a connecting block connected with the rotary shaft and a filter screen detachably connected with the connecting block.

Further, the intelligent cat litter box further includes:
a cat litter mat, which is used for bearing the cat litters;
a first flange, which is disposed in the cat litter placing area, and surrounds one cycle along the inner wall of the ball bin; and
a clamping accessory, which is disposed in the cat litter placing area, and is fit with the first flange to clamp the cat litter mat inside the first flange.

Further, the clamping accessory at least includes second flanges disposed inside the first flange at intervals and surrounding one cycle along the inner wall of the ball bin, the cat litter mat at least includes an elastic shaping strip and a surface mat that is covered on the elastic shaping strip and forms a cushion layer with the elastic shaping strip, and the elastic shaping strip can be clamped between first flange and the second flanges.

Further, the intelligent cat litter box further includes:
at least one assembly part, which is detachably disposed in the ball bin;
at least one deodorization assembly, which is in clamping fit with the assembly part and is capable of spraying a deodorant in the ball bin; and
a control unit, which is disposed in the deodorization assembly, and controls the deodorization assembly to spray or not spray by detecting a rotating tilt angle of the ball bin.

Further, the intelligent cat litter box further includes:
an excrement collecting bin door, which is disposed at a bin opening position of the excrement collecting bin, and at least includes a sealing plate that can rotate elastically in the excrement collecting bin only.

Further, the intelligent cat litter box further includes:
a beam ring, which is in clamping fit with the excrement collecting bin door, where a garbage bag can be fixed in the excrement collecting bin and a bag opening of the garbage bag is enabled to communicate with the bin opening of the excrement collecting bin.

Further, the beam ring at least includes a first ring body, two lugs elastically disposed on both sides of the first ring body respectively and two clamping strips disposed outside the two lugs respectively, bin walls on both sides of the bin opening position of the excrement collecting bin are further provided with two clamping blocks respectively, and the two clamping blocks are each provided with clamping slots capable of being in clamping fit with the two clamping strips.

Further, the excrement collecting bin door further includes a second ring body, a bottom of the first ring body is further provided with a protrusion, and the second ring body is further provided with a groove in plugging fit with the protrusion.

The beneficial effects of the present disclosure are reflected as follows.

The intelligent cat litter box in the present disclosure is provided with the filter screen assembly and the connector, the filter screen assembly is mounted at the opening position of the litter collecting bin through the connector to achieve the separation of the cat litter balls from the cat litters, and the cat litters enter the litter collecting bin. Since the connector is rotationally connected with the filter screen assembly and the filter screen assembly can be in clamping fit with the connector in the circumferential direction of the connector, when the filter screen assembly needs to be cleaned, the rotating filter screen assembly just rotates an angle in clamping fit with the connector by rotating the filter screen assembly, to achieve disassembly, and the disassembly operation is convenient and the filter screen assembly is enabled to be cleaned conveniently.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. The embodiments in the present disclosure and features in the embodiments may be combined with each other without conflict. Based on the embodiments of the present disclosure, all the other embodiments obtained by those of ordinary skill in the art on the premise of not contributing creative effort should belong to the protection scope of the present disclosure.

Figure 1:
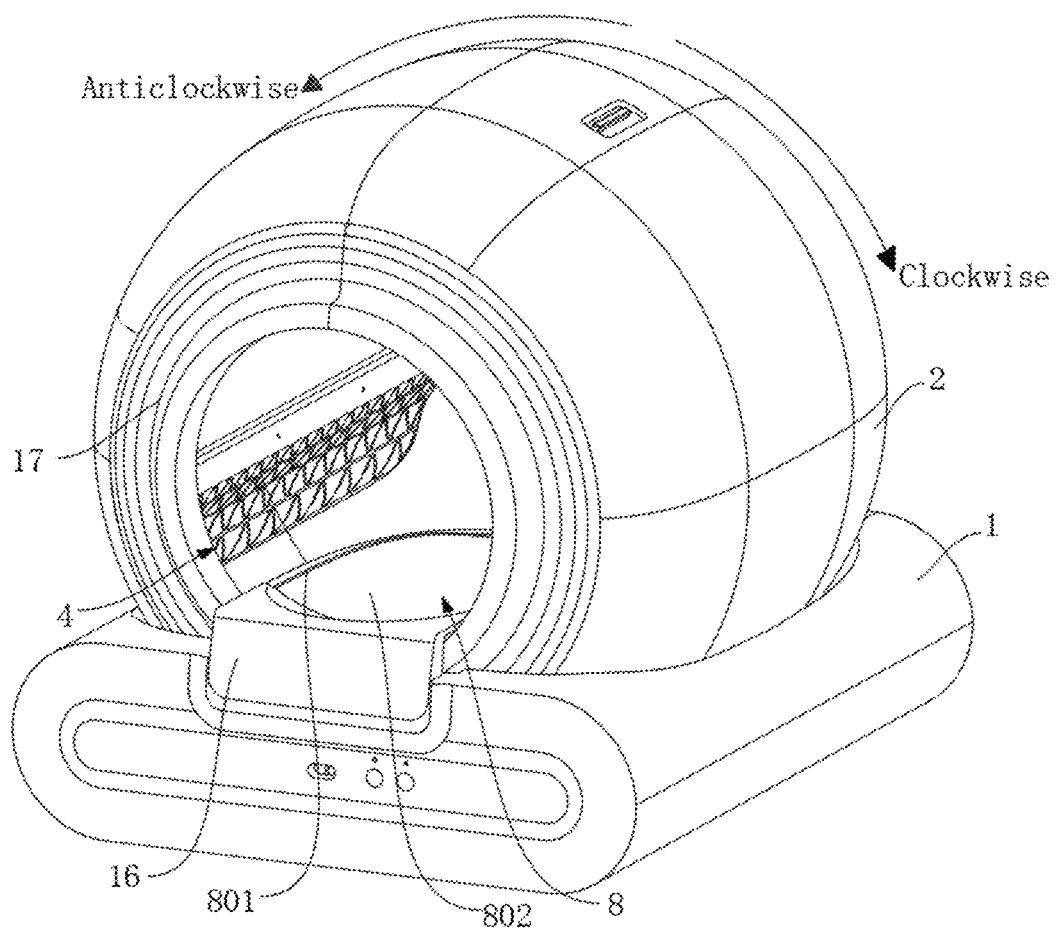
FIG. 1 is a schematic structural diagram of an intelligent cat litter box according to an embodiment of the present disclosure.
Figure 2:
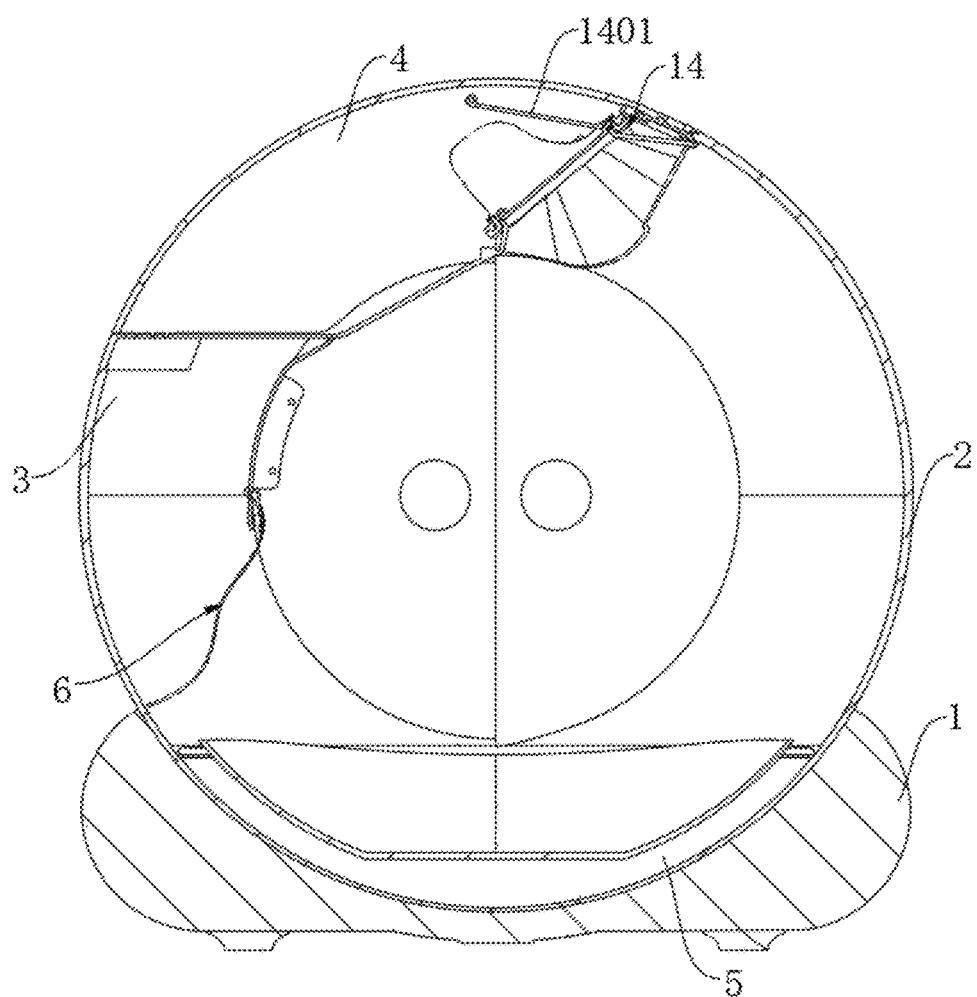
FIG. 2 is a front section view of a structure of an intelligent cat litter box according to an embodiment of the present disclosure.
Figure 3:
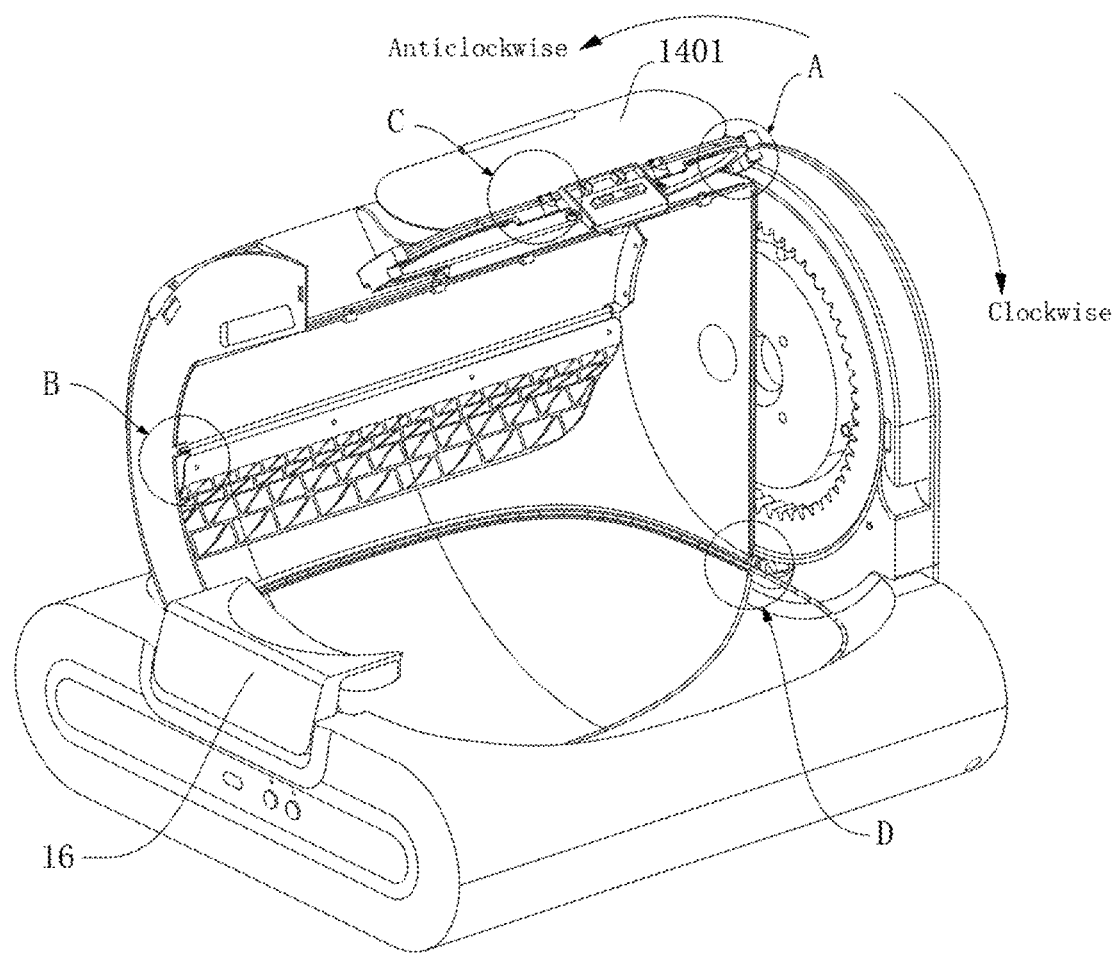
FIG. 3 is a partial section view of a structure of an intelligent cat litter box according to an embodiment of the present disclosure.
Figure 4:
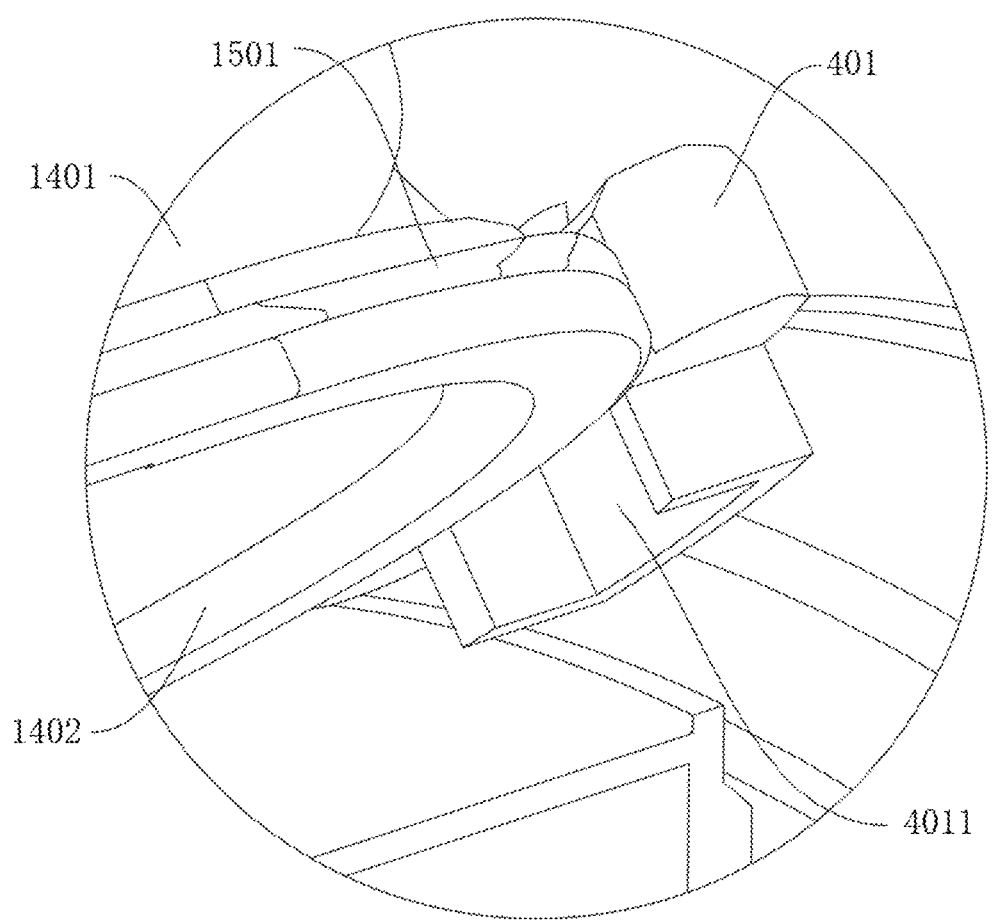
FIG. 4 is an enlarged view of a part A in FIG. 3.
Figure 5:
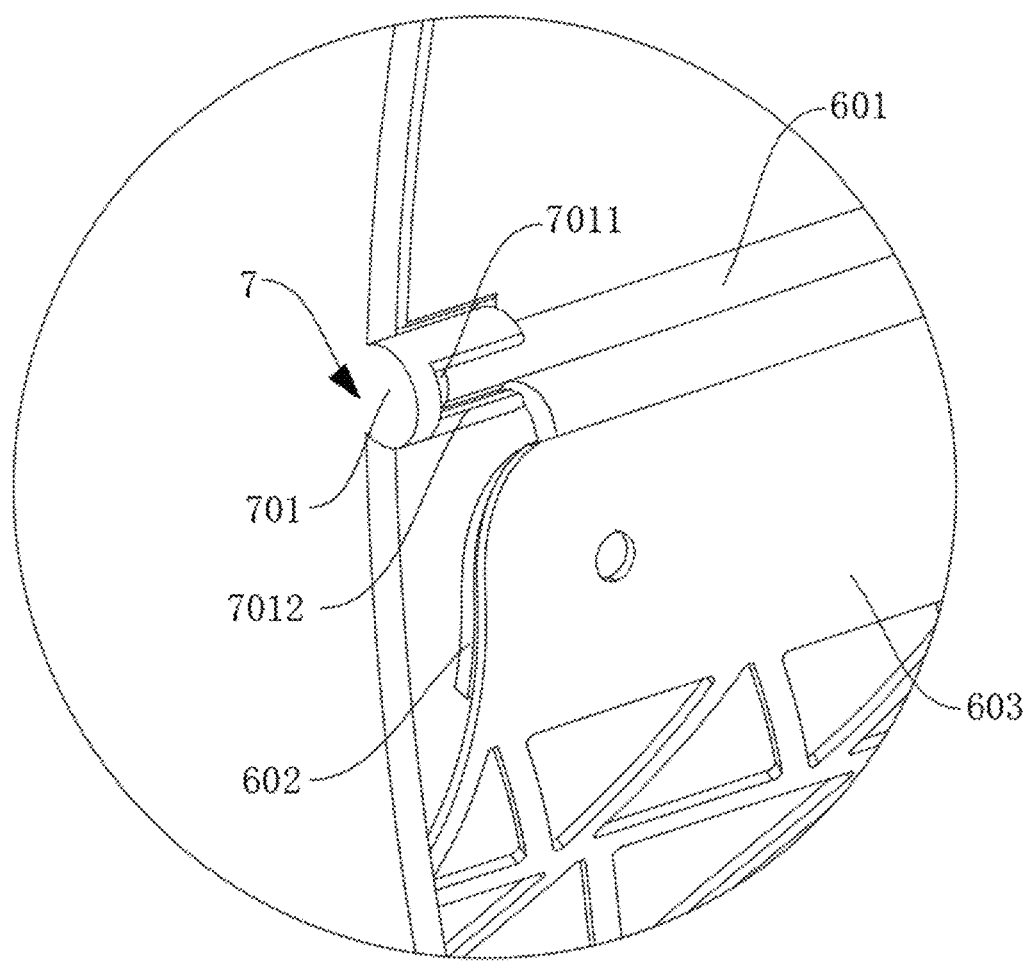
FIG. 5 is an enlarged view of a part B in FIG. 3.
Figure 6:
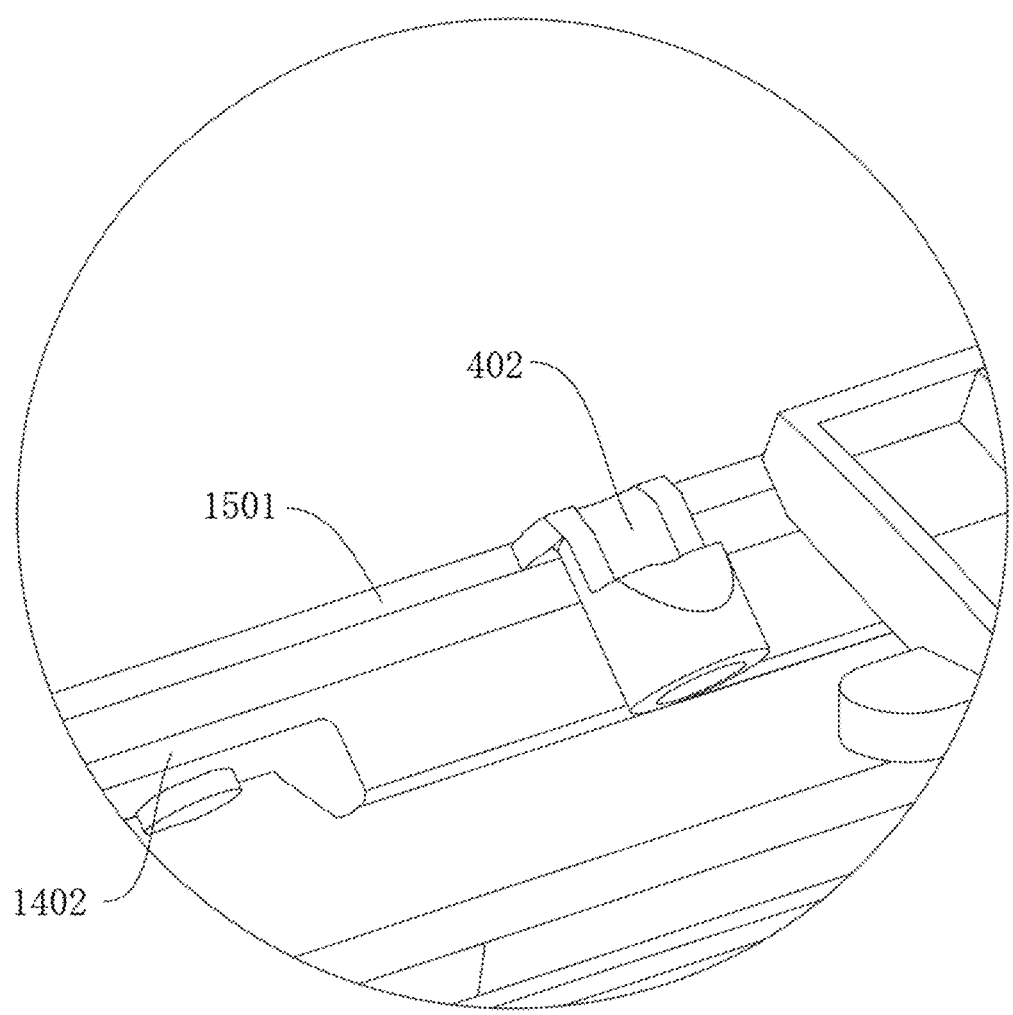
FIG. 6 is an enlarged view of a part C in FIG. 3.
Figure 7:
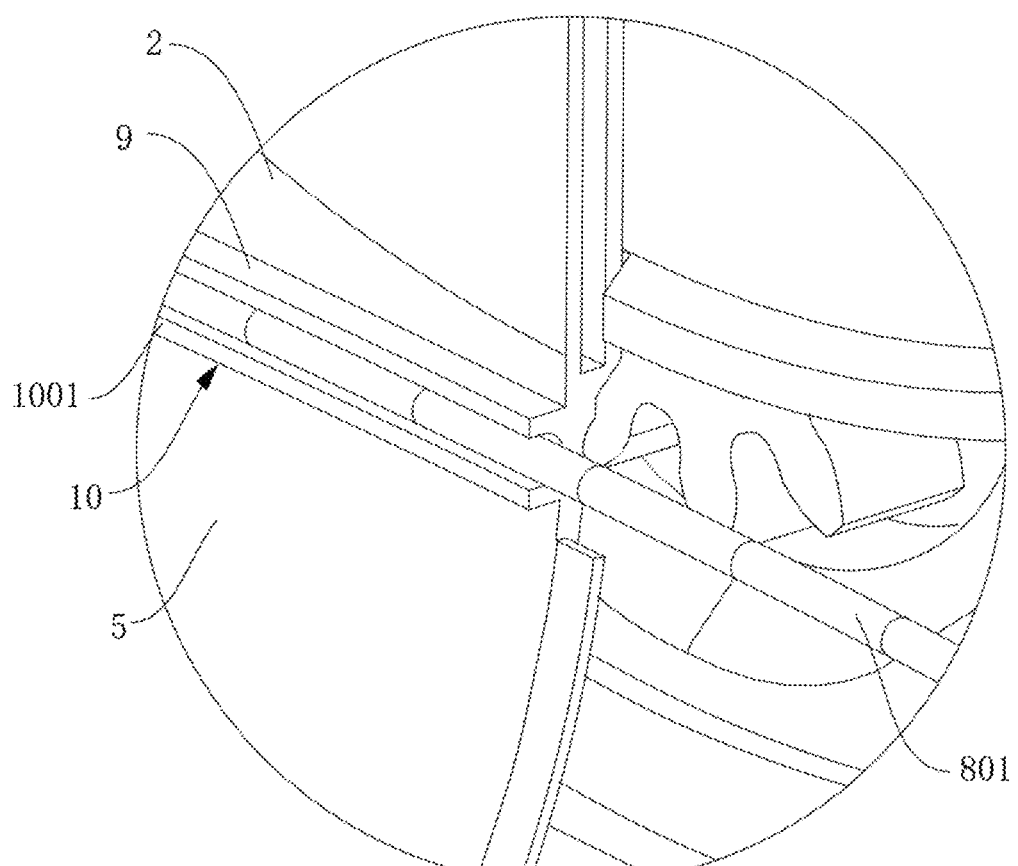
FIG. 7 is an enlarged view of a part D in FIG. 3.
Figure 8:
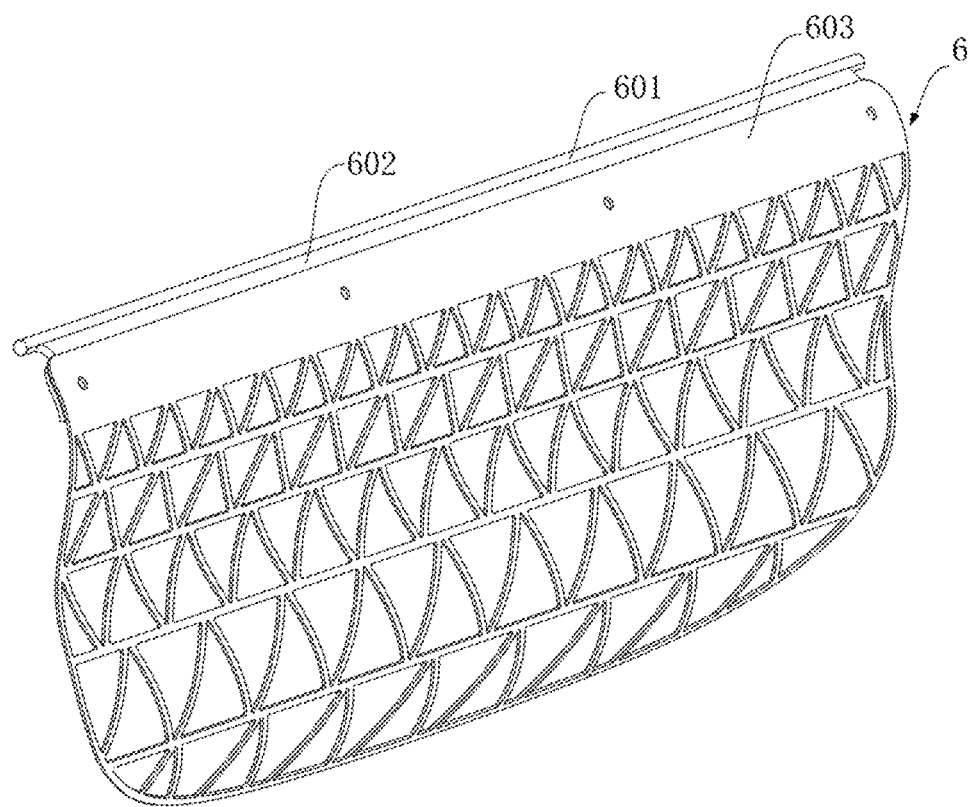
FIG. 8 is a schematic structural diagram of a filter screen assembly according to an embodiment of the present disclosure.
Figure 9:
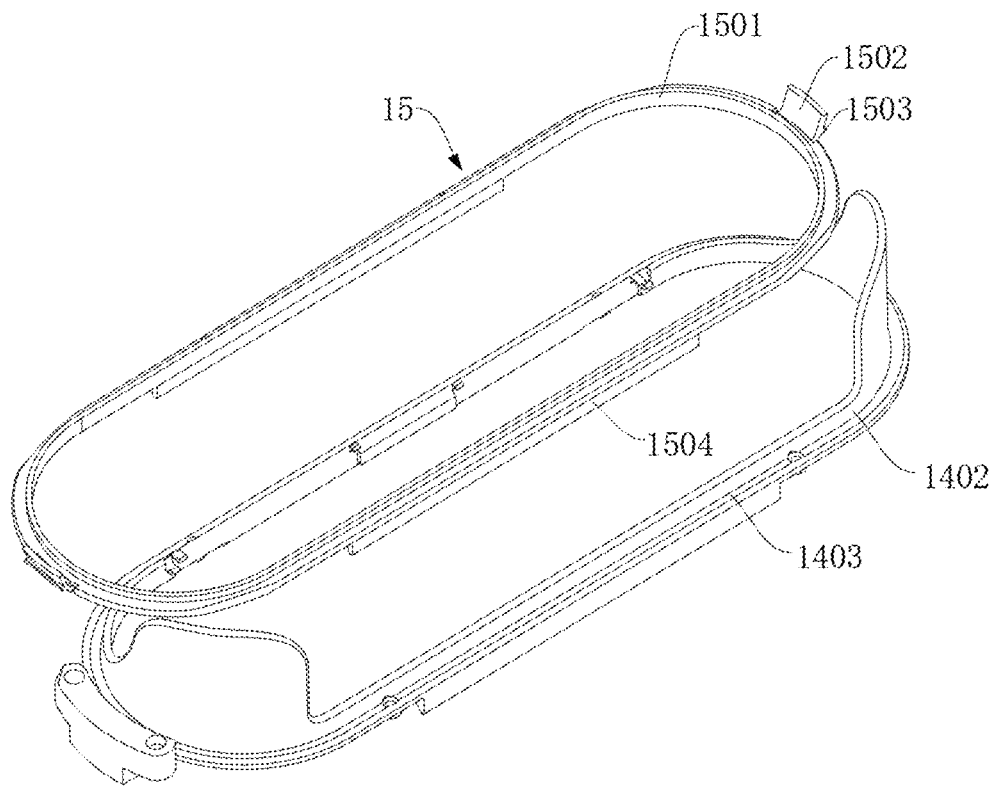
FIG. 9 is a partial structure disassembly diagram of a beam ring and an excrement collecting bin door according to an embodiment of the present disclosure.
Figure 10:
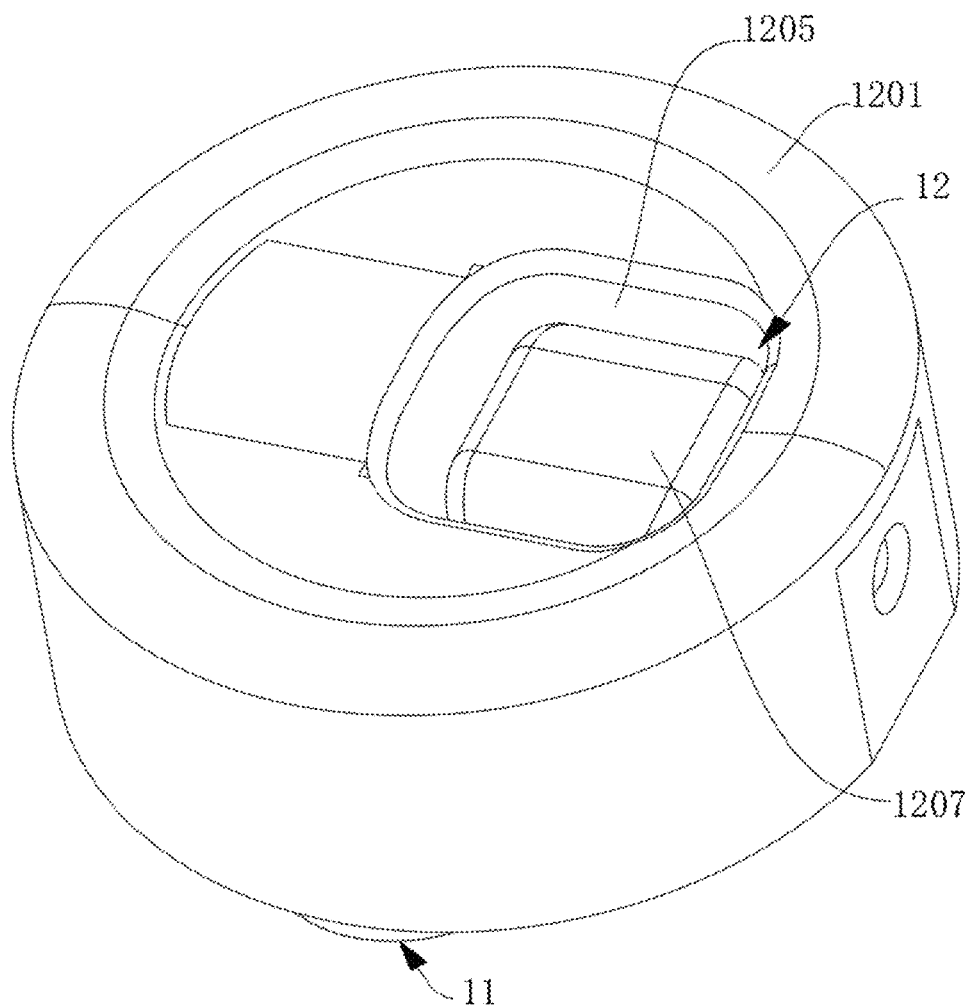
FIG. 10 is a schematic structural diagram of a housing according to an embodiment of the present disclosure.
Figure 11:
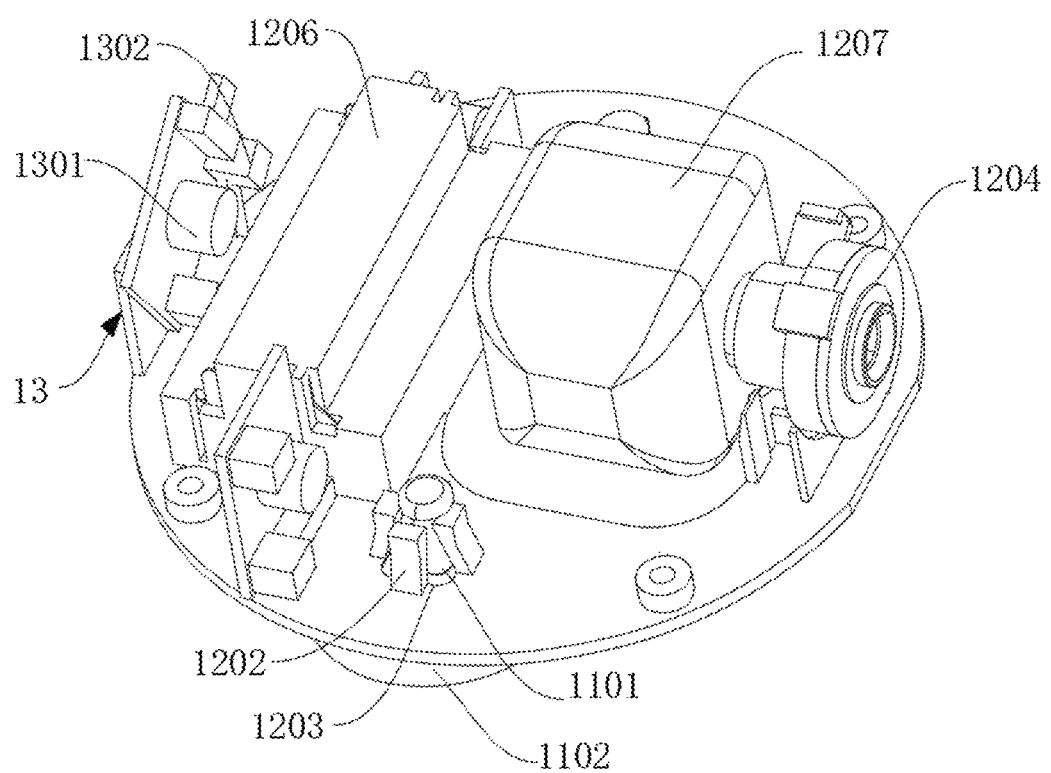
FIG. 11 is a schematic diagram of an inner structure of a housing according to an embodiment of the present disclosure.

Referring to FIG. 1 to FIG. 11, an intelligent cat litter box according to one embodiment of the present disclosure includes a bottom pallet 1, a ball bin 2 capable of rotating on the bottom pallet 1 in clockwise and counterclockwise directions, a litter collecting bin 3 disposed in the ball bin 2 to collect cat litters along the rotation of the ball bin 2, an excrement collecting bin 4 disposed in the ball bin 2 to collect cat litter balls along the rotation of the ball bin 2, and a cat litter placing area 5 disposed in the ball bin 2; wherein the cat litters in the cat litter placing area 5 can flow into the litter collecting bin 3 along the rotation of the ball bin 2, and the cat litters in the litter collecting bin 3 can flow into the cat litter placing area 5 along the rotation of the ball bin 2; and the intelligent cat litter box further includes:

a filter screen assembly 6, which is disposed at a respective opening position of the litter collecting bin 3, wherein an edge of one side away from the litter collecting bin 3 is able to fit with an inner wall of the ball bin 2; and a connector 7, which is disposed in the ball bin 2, and is not only able to fit with the filter screen assembly 6 rotationally in the clockwise and counterclockwise directions, but also is in clamping fit with the filter screen assembly 6 in itself circumferential direction.

The intelligent cat litter box provided by the present disclosure is provided with the filter screen assembly 6 and the connector 7, the filter screen assembly 6 is mounted at the opening position of the litter collecting bin 3 through the connector 7 to achieve the separation of the cat litter balls from the cat litters, and the cat litters enter the cat collecting bin 3. Since the connector 7 is rotationally connected with the filter screen assembly 6 and the filter screen assembly 6 can be in clamping fit with the connector 7 in the circumferential direction of the connector 7, when the filter screen assembly 6 needs to be cleaned, the rotating filter screen assembly 6 just rotates an angle in clamping fit with the connector 7 by rotating the filter screen assembly 6, to achieve disassembly, and the disassembly operation is convenient and the filter screen assembly 6 is enabled to be cleaned conveniently.

In one embodiment, the connector 7 at least includes two connecting columns 701 arranged symmetrically, each of the connecting columns 701 is provided with a rotary slot 7011 along itself length direction, and a circumferential direction of at least one of the connecting columns 701 is further provided with a gap 7012 communicating with the rotary slot 7011; and the filter screen assembly 6 includes a rotary shaft 601, both ends of the rotary shaft 601 can fit with the two rotary slots 7011 rotationally respectively, and the rotary shaft 601 can also be in clamping fit with the gap 7012. Such design achieves the detachable connection through the clamping fit of the rotary shaft 601 and the gap 7012, is simple in structure and convenient to operate. In this embodiment, a width size of the set gap 7012 is slightly less than a diameter size of the rotary shaft 601. In this embodiment, when one of the connecting columns 701 is provided with the gap 7012 and the rotary shaft 601 is disassembled, the end located on the rotary shaft 601 is pulled, and when the two connecting columns 701 are provided with the gaps 7012, the rotary shaft 601 is pulled along the direction of the plane where the gaps 7012 are located.

In one embodiment, the filter screen assembly 6 further includes a connecting block 602 connected with the rotary shaft 601 and a filter screen 603 detachably connected with the connecting block 602. Such design achieves the replaceability of the filter screen 603 through the detachable connection of the filter screen 603 and the connecting block 602, and the separation operation for different kinds of cat litters can be satisfied by replacing the filter screen 603 with different filter holes. In this embodiment, when the filter screen assembly 6 needs to be disassembled after the connecting block 602 is connected with the filter screen 603, the rotary shaft 601 needs to be rotated to an angle convenient to apply a force to pull the filter screen 603.

In one embodiment, the size of the filter hole of the filter screen 603 reduces gradually along a moving direction that the cat litters are separated from the litter balls. When the ball bin 2 is rotating, such design enables the more cat litter at the beginning to be filtered through the large filter holes, the cat litter balls are driven to move by the flowing of the cat litters in a filtering process of the cat litters, such that the movement of the cat litter balls is always slower than the cat litters, and subsequently, the size of the filter hole is reduced gradually with the reduction of the cat litters, to ensure that the cat litter balls will not enter the litter collecting bin 3 through the filter holes.

In one embodiment, the filter screen 603 is made of a metal material. Such design can reduce the wall-hanging risk of the cat litter balls, and in this embodiment, the metal material may adopt stainless steel, aluminium alloy or galvanized steel, and has anti-rust and portable characteristics.

In one embodiment, the filter screen assembly 6 is a wave bending shape, and a rotary connecting side of the filter screen assembly 6 and one side away from the litter collecting bin 3 are both in a trough position. When the cat litters are rotating along the ball bin 2, such design enables the cat litters to have a better acceleration and caching process when passing through the filter screen assembly 6.

In one embodiment, the intelligent cat litter box further includes:
  a cat litter mat 8, which is used for bearing the cat litters;
  a first flange 9, which is disposed in the cat litter placing area 5, and surrounds one cycle along the inner wall of the ball bin 2; and
  a clamping accessory 10, which is disposed in the cat litter placing area 5, and is fit with the first flange 9 to clamp the cat litter mat 8 inside the first flange 9. Such design can completely block the periphery of the cat litter mat 8 by setting one cycle of first flange 9, when the cat urinates to the inner wall of the ball bin 2 carelessly, the urine will finally remain on the cat litter mat 8 along the first flange 9, to avoid the urine remaining on the inner bottom of the ball bin 2 from the edge gap of the cat litter mat 8.

In one embodiment, the clamping accessory 10 at least includes second flanges 1001 disposed inside the first flange 9 at intervals and surrounding one cycle along the inner wall of the ball bin 2, the cat litter mat 8 at least comprises an elastic shaping strip 801 and a surface mat 801 that is covered on the elastic shaping strip 801 and forms a cushion layer with the elastic shaping strip 801, and the elastic shaping strip 801 can be clamped between first flange 9 and the second flanges 1001. Such design enables the second flanges 1001 and the first flange 9 to form a groove structure, and due to the elastic characteristic of the elastic shaping strip 801, the elastic shaping strip 801 can be pressed between the second flanges 1001 and the first flange 9 by extruding the elastic shaping strip 801 during installation, with convenient installation. During disassembly, the elastic shaping strip 801 can deform and break away from the gap between the second flanges 1001 and the first flange 9 by extruding the surface mat 802, with convenient disassembly. In this embodiment, the elastic shaping strip 801 can select the metal material.

In one embodiment, the intelligent cat litter box further includes:
  at least one assembly part 11, which is detachably disposed in the ball bin 2;
  at least one deodorization assembly 12, which is in clamping fit with the assembly part 11 and is capable of spraying a deodorant in the ball bin 2; and
  a control unit 13, which is disposed in the deodorization assembly 12, and controls the deodorization assembly 12 to spray or not spray by detecting a rotating tilt angle of the ball bin 2. In this embodiment, the control unit 13 functions in acquiring an input gradient threshold required for the outside first, then acquiring the current monitored rotation gradient numerical value of the ball bin 2, and finally comparing the input gradient threshold with the current gradient numerical value; when the current gradient numerical value is greater than or equal to the input gradient threshold, the control unit 13 controls the deodorization assembly 12 to act, and a deodorant is sprayed in the ball bin 2; and when the current gradient numerical value is less than the input gradient threshold, the control unit 13 controls the deodorization assembly 12 to not spray. Such design achieves that the deodorization assembly 12 is independent of the intelligent litter box through the control unit 13, whether or not the deodorant in the deodorization assembly 12 is sprayed can be controlled without depending on the control logic of the control system of the intelligent cat litter box, thus no problem incompatible with the intelligent cat litter box exists, and the maintenance cost can also be reduced when the cat litter box is damaged.

In one embodiment, the assembly part 11 at least includes a connecting bolt 1101, the deodorization assembly 12 at least includes a housing 1201 and a plurality of elastic clamping strips 1202, the housing 1201 has a mounting hole 1203 through which the connecting bolt 1101 runs, the plurality of elastic clamping strips 1202 are disposed in the housing 1201 and surround one cycle around the mounting hole 1203 to present a conical shape, and the plurality of elastic clamping strips 1202 are in clamping fit with the connecting bolt 1101. In this embodiment, a clamping end of the set connecting bolt 1101 is in a mushroom head shape, and clamping surfaces of the plurality of clamping strips 1202 are arc surfaces and can be attached to the bottom of the clamping end of the connecting bolt 1101.

In one embodiment, the filter screen assembly 11 further includes a connecting disk 1102 connected with the connecting bolt 1101, and the connecting disk 1102 is detachably connected with the ball bin 2. In this embodiment, the set connecting disk 1102 can be detachably connected in the ball bin 2 by adopting glue and screws.

In one embodiment, the deodorization assembly 12 further includes a deodorant bottle 1207 and an atomizing nozzle 1204, a containing cavity 1205 is provided outside the housing 1201, the deodorant bottle 1207 is disposed in the containing cavity 1205 and has a bottle opening that is located in the housing 1201 and detachably connected with the housing 1201, and the atomizing nozzle 1204 is disposed in the housing 1201 and detachably connected with the bottle opening of the deodorant bottle 1207. Such design achieves the direct replacement for the deodorant bottle 1207 after the deodorant therein is used up, and the deodorant bottle 1207 is disposed outside the housing 1201 through the containing cavity 1205, for ease of disassembly.

In one embodiment, the control unit 13 includes a sensor 1301 for detecting a rotary angle of the ball bin 2 and a control board 1302 that is used for receiving gradient data sent by the sensor 1301 and controlling the deodorization assembly 12 to be opened and closed according to the gradient data. In this embodiment, the set sensor 1301 may be a mechanical gyroscope and an optical fiber gyroscope in the existing technology, and the set control board 1302 may be a single chip microcomputer or a small programmable logic controller (PLC) board in the existing technology.

In one embodiment, the housing 1201 is also internally provided with an accumulator 1206 for supplying power to the atomizing nozzle 1204, the control board 1302 and the sensor 1301. In such design, the information interaction with itself control system of the intelligent cat litter box is not required through the independent power supply of the accumulator 1206, and a deodorization process is triggered only by monitoring the rotary angle of the ball bin 2, such that the deodorization process is more convenient.

In one embodiment, the intelligent cat litter box further includes: an excrement collecting bin door 14, which is disposed at a bin opening position of the excrement collecting bin 4, and at least includes a sealing plate 1401 that can rotate elastically in the excrement collecting bin 4 only. In such design, when the cat litter balls enter the excrement collecting bin 4, the sealing plate 1401 is opened automatically through the elastic rotation of the sealing plate 1401, the sealing plate 1401 is closed automatically after entering the excrement collecting bin 4, to avoid the cat litter balls entering the excrement collecting bin 4 and falling out of the bin opening of the excrement collecting bin 4; and in this embodiment, the elastic and rotary connection of the sealing plate 1401 can be achieved through a torsional spring.

In one embodiment, the intelligent cat litter box further includes: a beam ring 15, which is in clamping fit with the excrement collecting bin door 14, where a garbage bag can be fixed in the excrement collecting bin 4 and a bag opening of the garbage bag is enabled to communicate with the bin opening of the excrement collecting bin 4. In such design, the bag opening of the garbage bag is fixed through the beam ring 15, to avoid the garbage bag breaking away from the excrement collecting bin door 14 due to pulling the garbage bag when the cat litter balls enter the garbage bag from the bin opening of the excrement collecting bin 4.

In one embodiment, the beam ring 15 at least includes a first ring body 1501, two lugs 1502 elastically disposed on both sides of the first ring body 1501 respectively and two clamping strips 1503 disposed outside the two lugs 1502 respectively, bin walls on both sides of the bin opening position of the excrement collecting bin 4 are further provided with two clamping blocks 401 respectively, and the two clamping blocks 401 are each provided with clamping slots 4011 capable of being in clamping fit with the two clamping strips 1503. In such design, when the garbage bag is subjected to a fixed operation, the edge of the bag opening of the garbage bag is wrapped on the first ring body 1501, then the two lugs 1502 are close to each other and the two clamping strips 1503 are clamped into the two clamping slots 4011 by pressing to achieve the fixed operation of the beam ring 15; and during disassembly, the two lugs 1502 are likewise close to each other for extrusion, to achieve the two clamping strips 1503 breaking away from the two clamping slots 4011.

In one embodiment, the excrement collecting bin door 14 further includes a second ring body 1402, a bottom of the first ring body 1501 is further provided with a protrusion 1504, and the second ring body 1402 is further provided with a groove 1403 in plugging fit with the protrusion 1504. When such design enables the garbage bag to be clamped and fixed, a part of the garbage bag can be clamped into the groove 1403 through the protrusion 1504, such that the fixation for the garbage bag is relatively firm; and in this embodiment, the sealing plate 1401 is elastically and rotationally connected to the second ring body 1402.

In one embodiment, a bin wall of the excrement collecting bin 4 is also detachably provided with at least one pressing block 42 for extruding the first ring body 1501. In such design, the pressing block 402 is added to extrude the first ring body 1501 to increase an extrusion force, such that the clamping and fixation for the garbage bag are relatively firm.

In one embodiment, the intelligent cat litter box further includes: a pedal 16, which is disposed at an entrance of the ball bin 2 and having a tread surface presenting a recessed arc shape. In such design, after the cat enters the ball bin 2 for defecation and treads the pedal 16, the cat litters attached to paws of the cat can fall onto an upper surface of the pedal 16 and fall into the ball bin 2 again along with the pedal 16.

In one embodiment, the respective bin door position of the ball bin 2 is further provided with a litter and water drainage outlet. Such design facilitates the drainage of the cat litters and sewage through the litter and water drainage outlet when an interior of the ball bin 2 is cleaned.

In one embodiment, the intelligent cat litter box further includes: a barrel ring 17, which is detachably disposed at the bin door position of the ball bin 2. In such design, the litter and water drainage outlet is blocked through the barrel ring 17, the bin door of the ball bin 2 is big as far as possible for ease of cleaning the ball bin 2 under the blockage of the barrel ring 17, and finally the bin door size of the ball bin 2 is ultimately controlled to a suitable size that the cat can enter or go out through the barrel ring 17, to avoid the cat digging the cat litters to the outside of the ball bin 2 when digging the litters due to a too large bin opening of the ball bin 2.

Moreover, in the present disclosure, whether or not the cat is in the ball bin 2 is detected through a gravity sensor throughout the excrement cleaning and control process as well as the deodorization process of the intelligent cat litter box. No ball bin 2 does not move, if the timing reaches a certain duration, the ball bin 2 rotates anticlockwise, and then the ball bin 2 rotates clockwise after a period of time. When the sensor 1301 monitors that the rotating angle rotating clockwise exceeds a specified threshold, the deodorization assembly 12 is started to spray the deodorant in the ball bin 2. This section of control system can be achieved by the existing technology, and repetitions are not made herein.

In conclusion, the intelligent cat litter box provided by one embodiment of the present disclosure is provided with the filter screen assembly 6 and the connector 7, the filter screen assembly 6 is mounted at the opening position of the litter collecting bin 3 through the connector 7 to achieve the separation of the cat litter balls from the cat litters, and the cat litters enter the litter collecting bin 3. Since the connector 7 is rotationally connected with the filter screen assembly 6 and the filter screen assembly 6 can be in clamping fit with the connector 7 in the circumferential direction of the connector 7, when the filter screen assembly 6 needs to be cleaned, the rotating filter screen assembly 6 just rotates an angle in clamping fit with the connector 7 by rotating the filter screen assembly 6, to achieve disassembly, and the disassembly operation is convenient and the filter screen assembly 6 is enabled to be cleaned conveniently.

The periphery of the cat litter mat 8 can be completely blocked by setting one cycle of first flange 9, when the cat urinates to the inner wall of the ball bin 2 carelessly, the urine will finally remain on the cat litter mat 8 along the first flange 9, to avoid the urine remaining on the inner bottom of the ball bin 2 from the edge gap of the cat litter mat 8.

The deodorization assembly 12 independent of the intelligent litter box can be achieved through the control unit 13, whether or not the deodorant in the deodorization assembly 12 is sprayed can be controlled without depending on the control logic of the control system of the intelligent cat litter box, thus no problem incompatible with the intelligent cat litter box exists, and the maintenance cost can also be reduced when the cat litter box is damaged.

It should be understood that the examples and implementation modes of the present disclosure are merely for description, not intended to limit the present disclosure. Those skilled in the art can make various modifications or changes, and any modifications, equivalent replacements, improvements and the like made within the spirit and principle of the present disclosure shall fall within the protection scope of the present disclosure.

It is to be noted that if directional indication, such as: upper, lower, left, right, front, rear, etc. is involved in the embodiments of the present disclosure, the directional indication is merely used to explain the relative position relation, movement and the like of various components under a certain special posture (as shown in the drawings); and if the special posture is changed, the directional indication will change accordingly.

In addition, if the descriptions "first", "second" and the like are involved in the embodiments of the present disclosure, the descriptions "first", "second" and the like are merely used for description, instead of being understood as indicating or implying relative importance or impliedly indicating the quantity of the showed technical features. Thus, the features defined with "first" and "second" may expressly or impliedly one or more features. In addition, the meaning of "and/or" in the text includes three parallel schemes, take "A and/or B" for example, including A scheme, or B scheme, or the scheme meeting A and B at the same time. In addition, "a plurality of" means two or above two. Thus, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

What is claimed is:

1. An intelligent cat litter box, comprising a bottom pallet, a ball bin capable of rotating on the bottom pallet in clockwise and counterclockwise directions, a litter collecting bin disposed in the ball bin to collect cat litters along the rotation of the ball bin, an excrement collecting bin disposed in the ball bin to collect cat litter balls along the rotation of the ball bin, and a cat litter placing area disposed in the ball bin; wherein the cat litters in the cat litter placing area are capable of flowing into the litter collecting bin along the rotation of the ball bin, and the cat litters in the litter collecting bin are capable of flowing into the cat litter placing area along the rotation of the ball bin, the intelligent cat litter box further comprises:
   a filter screen assembly, which is disposed at a respective opening position of the litter collecting bin, wherein an edge of one side away from the litter collecting bin is able to fit with an inner wall of the ball bin; and
   a connector, which is disposed in the ball bin, wherein the connector is snap-fitted with the filter screen assembly and the filter screen assembly is able to rotate around the connector in the clockwise and counterclockwise directions;
   wherein the connector at least comprises two connecting columns arranged symmetrically, each of the connecting columns is provided with a first slot, and a circumferential direction of at least one of the connecting columns is further provided with a gap communicating with the first slot; and the filter screen assembly comprises a rotary shaft, both ends of the rotary shaft are able to fit with the two first slots rotationally respectively, and the rotary shaft is also able to be in clamping fit with the gap;
   wherein the intelligent cat litter box further comprises:
   a cat litter mat, which is used for bearing the cat litters;
   a first flange, which is disposed in the cat litter placing area, and surrounds the cat litter mat; and
   a clamping accessory, which is disposed in the cat litter placing area, and is fit with the first flange to clamp the cat litter mat inside the first flange;
   wherein the clamping accessory at least comprises second flanges disposed inside the first flange at intervals and surrounding the cat litter mat, the cat litter mat at least comprises an elastic shaping strip and a surface mat that is covered on the elastic shaping strip and forms a cushion layer with the elastic shaping strip, and the elastic shaping strip is able to be clamped between first flange and the second flanges;
   wherein the intelligent cat litter box further comprises:
   at least one assembly part, which is detachably disposed in the ball bin;
   at least one deodorization assembly, which is in clamping fit with the assembly part and is capable of spraying a deodorant in the ball bin; and
   a control unit disposed in the deodorization assembly, wherein the control unit controls the deodorization assembly to spray or not spray by detecting a rotating tilt angle of the ball bin;
   wherein the intelligent cat litter box further comprises: an excrement collecting bin door, which is disposed at a bin opening position of the excrement collecting bin, and at least comprises a sealing plate that is able to rotate elastically in the excrement collecting bin only;
   wherein the intelligent cat litter box further comprises: a beam ring, which is in clamping fit with the excrement collecting bin door, a garbage bag is able to be fixed in the excrement collecting bin and a bag opening of the garbage bag is enabled to communicate with the bin opening of the excrement collecting bin;
   the beam ring at least comprises a first ring body, two lugs elastically disposed on both sides of the first ring body respectively and two clamping strips disposed outside the two lugs respectively, bin walls on both sides of the respective bin opening position of the excrement collecting bin are further provided with two clamping blocks respectively, and the two clamping blocks are each provided with clamping slots capable of being in clamping fit with the two clamping strips; and
   the excrement collecting bin door further comprises a second ring body, a bottom of the first ring body is further provided with a protrusion, and the second ring body is further provided with a groove in plugging fit with the protrusion.

2. The intelligent cat litter box according to claim 1, wherein the filter screen assembly further comprises a connecting block connected with the rotary shaft and a filter screen detachably connected with the connecting block.

* * * * *